3,324,100
MASTICATING POLYBUTADIENE
Gerard Kraus, Bartlesville, Okla., assignor to Phillips Petroleum Company, a corporation of Delaware
No Drawing. Filed Oct. 29, 1962, Ser. No. 233,863
9 Claims. (Cl. 260—94.7)

This invention relates to an improvement in the masticating of polybutadiene. In another aspect, it relates to an improved process for masticating homopolymers of 1,3-butadiene, particularly polybutadiene with a high cis configuration. In another aspect, it relates to improved processable polybutadiene compositions, and to the vulcanized compositions thereof.

In the manufacturing operations for producing vulcanized rubber articles, it is the usual practice to subject the unvulcanized rubber to mastication, mechanical working, or milling in the present of air or oxygen to change the rubber to a more soft, pliable condition prior to molding or shaping the rubber and vulcanizing the same. This mastication, for example on a roll mill, internal mixer, or screw plasticator, breaks the tenacity of the rubber and the degree to which it is broken down is influenced by the time, temperature and the vigor of the mechanical working. Some types of rubber readily break down upon milling. With other types of rubber, the desired changes can only be achieved under prolonged treatment, and in many instances this treatment is accompanied by detrimental changes in the properties of the vulcanizates. In order to reduce the time and power required to improve the processability of the rubber and prevent deterioration of the rubber resulting from extended milling operations, it is a common practice to incorporate into the rubber a peptizing or chemical plasticizing agent which accelerates the effect of the mechanical working of the rubber and facilities incorporation of compounding ingredients such as carbon black and other reinforcing agents, accelerators, vulcanizing agents, etc. Some peptizing agents will give the desired improvement in processability for some rubbers and not for others. Many of the peptizing agents used heretofore must be used in fairly large amounts to bring about satisfactory acceleration in the processing of the rubber, some give rise to disagreeable odor or odor development in the rubber, while others are toxic when in contact with the skin or inhaled.

Polybutadienes, i.e., homopolymers of 1,3-butadiene, are particularly difficult to break down during milling, and this invention is primarily concerned with improving the processability of such rubbers.

Accordingly, an object of this invention is to improve the processing, mechanical working, or masticating of unvulcanized polybutadiene by incorporating into the polybutadiene to be masticated a novel peptizing agent. Another object is to provide improved processable polybutadiene compositions which can be masticated or mechanically worked in a relatively short time with low power requirements. A further object is to provide processable polybutadiene compositions. Further objects and advantages of this invention will become apparent to those skilled in the art from the following discussion and appended claims.

Briefly, I have discovered that the mastication or mechanical working of unvulcanized polybutadiene can be improved by incorporating iron acetylacetonate into the polybutadiene. The improvement in processability of polybutadiene through the use of iron acetylacetone is particularly surprising and unexpected in view of the fact that other metal acetylacetonates do not give such improved processability.

Both ferrous and ferric acetylacetonates can be employed as peptizing agents, though I prefer to use ferrous acetylacetonate alone since it is somewhat more effective. Unless otherwise specified, the term iron acetylacetonate is used herein and in the appended claims to generically cover both the ferrous and the ferric acetylacetonates.

The iron acetylacetonate can be employed in this invention in relatively low amounts (in many instances, much lower than prior art peptizers) and does not create an odor problem in handling or use. This peptizing agent is incorporated into the polybutadiene and the mixture milled or masticated in a conventional rubber masticator or mixer in the presence of air or oxygen, the mixing time being dependent to some extent on the vigor of the mixing action. Mastication of the polybutadiene in the presence of the peptizing agent of this invention can take place prior to compounding with conventional compounding ingredients, or can take place in the presence of such compounding ingredients. It is also within the scope of this invention to carry out the mastication in the presence of the peptizing agent of this invention together with so-called "physical plasticizers," such as aromatic oils.

The amount of iron acetylacetonate to be used in this invention can vary and will be dependent upon such factors as the particular rubber being milled, the milling temperature, and whether other plasticizers and compounding ingredients are present. Stated functionally, the amount of peptizing agent used will be an amount sufficient to improve the breakdown of the rubber. Generally, the amount of the peptizing agent used will be in the range of 0.003 to 0.1 part by weight of iron acetylacetonate per 100 parts rubber, preferably in the range of 0.009 to 0.075 part by weight of iron per 100 parts rubber.

Generally, the mastication will be carried out in the range of 3 to 10 minutes. The temperature of the mastication can vary but generally will be above 100° C. and preferably at least 110° C., the peptizing action being relatively slow at lower temperatures. Temperatures up to 250° C. can be used.

It is also within the scope of this invention to employ along with the novel peptizing agent of this invention other conventional peptizing agents.

I have found that the peptizing action of the novel peptizing agent of this invention can be improved to a certain extent by also incorporating organic peroxides. Such peroxides aid in the breakdown of the rubber and improve the general milling operation. When such peroxides are used in conjunction with the iron acetylacetonate peptizing agent of this invention, the amount of the organic peroxide used will generally be in the range sufficient to provide from 0.004 to 0.05, preferably from 0.01 to 0.04, parts by weight of peroxy oxygen (—O—O—) per 100 parts rubber, with the amount of iron acetylacetonate preferably exceeding that of the peroxy oxygen, i.e., the weight ratio of the iron in the iron acetylacetonate to peroxy oxygen in the peroxide generally being at least 1.5:1.

The organic peroxides which can be used in conjunction with the iron acetylacetonate of this invention are well known and can be represented by the general formulas R—O—O—R or R—O—O—H (the latter generally being known as hydroperoxides but included in the term "organic peroxides" as used herein, unless otherwise noted) where R is selected from the group consisting of an acyl radical, a saturated acyclic radical, an olefinically unsaturated acyclic radical, a saturated cyclic radical, an olefinically unsaturated cyclic radical, and an aromatic radical, and wherein said R radical can be substituted with a member selected from the group consisting of a halogen, a hydroxy radical and a R'O-radical, wherein R' is selected from the group consisting of an acyl radical, a saturated acyclic radical, an olefinically unsaturated acyclic radical, a saturated cyclic radical, an olefinically unsaturated cyclic radical, and an aromatic radical. It is to be understood that mixed compounds can be used, e.g., organic peroxides in which one of the oxygens of the peroxy group is joined to a hydrocarbon group, such as alkyl or cycloalkyl, while the other oxygen is joined to an acyl group. Peroxy compounds which are half-esters or diesters of dicarboxylic acids are also applicable as well as monoperoxy compounds derived from the dicarboxylic acids. Examples of suitable peroxides include the following: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4-methyl-2-hexenyl) peroxide, bis(4-octenyl) peroxide, diacetyl peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[diisopropyl-(4-isopropylphenyl)methyl]peroxide, bis[dimethyl-(4-tert-butylphenyl)-methyl]peroxide, benzyl alpha-methylbenzyl peroxide, bis-(4-chlorobenzoyl) peroxide, bis(2,4-dichlorobenzoyl) peroxide, bis(2-propoxy-n-hexyl) peroxide, n-pentyl 5,8-diphenyldodecyl peroxide, bis(9,10-dihydroxydecyl) peroxide, 2,5-bis(tert-butylperoxy)-2,5-dimethylhexane, bis(2-hydroxyheptyl) peroxide, tertbutyl hydroperoxide, dodecyl hydroperoxide, eicosyl hydroperoxide, triacontanyl hydroperoxide, 4-methylcyclohexyl hydroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl-(4-isopropylphenyl) hydroperoxymethane], (4-ethoxyphenyl)methyl hydroperoxide, di-n-hexyl(4-hydroxyphenyl)hydroperoxymethane, dimethyl (3-methoxyphenyl)hydroperoxymethane, peroxybenzoic acid, peroxybutyric acid, peroxydodecanoic acid, tert-butyl peroxybenzoate, di-tert-amyl diperoxyphthalate, tert-dodecyl peroxyacetate, the OO-tert-butyl half ester of peroxymaleic acid [HOOC—CH=CH—CO—O$_2$—C(CH$_3$)$_3$], and the OO-n-amyl half ester of peroxyphthalic acid. Peroxides formed by the oxidation of terpene hydrocarbons such as pinane, alpha-pinene, p-menthane, and turpentine can also be used. The peroxides which are preferred in this invention are those which decompose at a comparatively low temperature, e.g., at a temperature in the range of 250 to 350° F., and the preferred peroxide is cumene hydroperoxide.

As mentioned hereinbefore, the peptizing agent of this invention is broadly useful in improving the processability of "polybutadienes," this term as used herein and in the appended claims covering the synthetic homopolymers of 1,3-butadiene. My invention is particularly valuable and I prefer to practice it with polybutadienes having relatively high cis configuration, and the term "cis-polybutadiene" is used herein and in the appended claims to mean a polybutadiene polymer in which at least 75 percent, preferably at least 85 percent, of the polymer is formed by 1,4-addition of 1,3-butadiene and has the cis-configuration. Polybutadienes of this type are frequently produced having inherent viscosities between 2.3 and 3.0 and it is highly desirable that such polymers be treated in order to reduce their inherent viscosity to a value in the range of about 1.7 to 2.3 for the sake of improved processability.

Inherent viscosity is determined by placing 0.1 gram of polymer in a wire cage in 100 milliliters of toluene and allowing the polymer to stand at room temperature (about 25° C.) for 24 hours. The cage is then removed and the solution filtered through a sulfur absorption tube of grade C porosity to remove solid particles. The solution is then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers are determined by dissolving a sample of the polymer in carbon disulfide to form a solution of 25 grams of polymer per liter of solution. Using a commercial infrared spectrometer the infrared spectrum of the solution (percent transmission) is then determined.

The percent of the total unsaturation present as trans 1,4- is calculated according to the following equation and consistent units:

$$\epsilon = \frac{E}{tc}$$

where $\epsilon$ is extinction coefficient (liters-mols$^{-1}$-centimeters$^{-1}$); $E$ is extinction (log $I_0/I$); $t$ is path length (centimeters); and $c$ is concentration (mole double bond/liter). The extinction is determined at the 10.35 micron band and the extinction coefficient is 146 (liters-mols$^{-1}$-centimeters$^{-1}$).

The percent of the total unsaturation present as 1,2- (or vinyl) is calculated according to the above equation, using 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each C$_4$ unit in the polymer.

The rubber compositions of this invention can have incorporated therein the various compounding materials, including reinforcing pigments such as carbon black, zinc oxide, magnesium carbonate, etc., and other fillers, sulfur, accelerators, and the novel peptizing or chemical plasticizing agents of this invention. Stocks from such compositions will be useful for footwear, extruded articles, tire carcasses, tire treads, and other mechanical goods.

The objects and advantages of this invention are further illustrated in the following examples, but it should be understood that the materials, conditions, and proportions used in these examples are only typical and should not be construed to limit this invention unduly.

*Example 1*

The effect of ferrous and ferric acetylacetonates, alone and in combination with cumene hydroperoxide, on the breakdown of cis-polybutadiene in air was determined by mastication of the elastomer in a Brabender Plastograph. A control run was made without any iron acetylacetonate or cumene hydroperoxide. The cis-polybutadiene employed was prepared by polymerization of 1,3-butadiene in the presence of a catalyst system comprising triisobutylaluminum, titanium tetrachloride and iodine. It was a gel-free polymer that had a Mooney value (ML-4 at 212° F.) of 46.5, an inherent viscosity of 2.54, a cis content of 94.9%, a trans content of 2.0%, and a vinyl content of 3.1%.

The additives were milled into the polymer on a cooled 2-inch roll mill before charging into the Plastograph. The jacket temperature of the Plastograph was regulated at 100° C. and the recorders set and zeroed. The polymer was cut into ribbons and fed into the mixing head as rapidly as possible with the mixer set at approximately 25 r.p.m. This operation required less than a minute. The charge weight to the Plastograph was 47 grams. The mixing was then started by starting the motor and setting the speed at 100 r.p.m. The torque (meter-kilograms) required to turn the rotors was recorded, readings being made of the initial torque (0.5 min.) and the final torque (6 min.). Air was present in all runs during the mixing. The results are set forth in Table I.

TABLE I

| Run | Iron acetylacetonate | | Amt. of cumene hydroperoxide, phr. | Wt. ratio of iron in the acetylacetonate to peroxy oxygen | Torque (m.-kg.) | |
|---|---|---|---|---|---|---|
| | Species | Amt., phr. | | | Initial | Final |
| 1 | None | 0 | 0 | 0 | [1] 2.03 | 1.98 |
| 2 | Ferrous | 0.5 | 0 | 0 | 2.06 | 1.47 |
| 3 | do | 0.5 | 0.15 | 7.3/1 | 2.10 | 1.33 |
| 4 | Ferric | 0.5 | 0 | 0 | 2.10 | 1.74 |
| 5 | do | 0.5 | 0.15 | 5.3/1 | 2.19 | 1.36 |

[1] This value is torque after 1 min.

The data of Table I show that both ferrous and ferric acetylacetonates are effective peptizers (they both gave significant decrease in torque), though the former is somewhat more effective. The data also show that when these peptizers are used in conjunction with an organic peroxide, further decrease in torque can be obtained.

Various modifications and alterations of this invention will become apparent to those skilled in the art from the foregoing description or examples without departing from the scope and spirit of this invention, and it should be understood that this invention is not to be limited unduly to that set forth herein for illustrative purposes.

I claim:

1. In the process of masticating unvulcanized, rubbery polybutadiene, the improvement comprising incorporating iron acetylacetonate into said polybutadiene in an amount sufficient to improve the breakdown thereof.

2. The process according to claim 1 wherein said polybutadiene comprises at least 75 percent cis-polybutadiene formed by 1,4-addition of 1,3-butadiene, and wherein the amount of said iron acetylacetonate incorporated is in the range of 0.003 to 0.1 part by weight of iron in said iron acetylacetonate per 100 parts polybutadiene.

3. The process according to claim 1 wherein said iron acetylacetonate is ferrous acetylacetonate.

4. The process according to claim 1 wherein said iron acetylacetonate is ferric acetylacetonate.

5. The process according to claim 2 wherein an organic peroxide is also incorporated into said polybutadiene in an amount sufficient to provide from 0.004 to 0.05 part by weight of peroxy oxygen per 100 parts butadiene.

6. The process according to claim 5 wherein said organic peroxide is cumene hydroperoxide.

7. In the process of masticating an unvulcanized rubbery polybutadiene comprising at least 75 percent cis-polybutadiene formed by 1,4-addition of 1,3-butadiene, the improvement comprising incorporating ferrous acetylacetonate into said polybutadiene in an amount in the range of 0.003 to 0.1 part by weight of iron in said acetylacetonate per 100 parts polybutadiene.

8. In the process of masticating an unvulcanized rubbery polybutadiene comprising at least 75 percent cis-polybutadiene formed by 1,4-addition of 1,3-butadiene, the improvement comprising incorporating ferric acetylacetonate into said polybutadiene in an amount in the range of 0.003 to 0.1 part by weight of iron in said acetylacetonate per 100 parts polybutadiene.

9. The process according to claim 8, which further comprises incorporating cumene hydroperoxide into said polybutadiene in an amount sufficient to provide from 0.004 to 0.08 part by weight of peroxy oxygen per 100 parts polybutadiene.

References Cited

UNITED STATES PATENTS 3,031,441   4/1962   Verheyden et al. ____ 260—94.3

MORRIS LIEBMAN, *Primary Examiner.*

J. W. BEHRINGER, J. H. DERRINGTON,
*Assistant Examiners.*